April 13, 1948.    H. D. FOWLER    2,439,423
LOCKING AND SAFETY SIGNAL COMBINATION FOR CARGO AIRPLANES
Filed Dec. 21, 1942    4 Sheets-Sheet 1
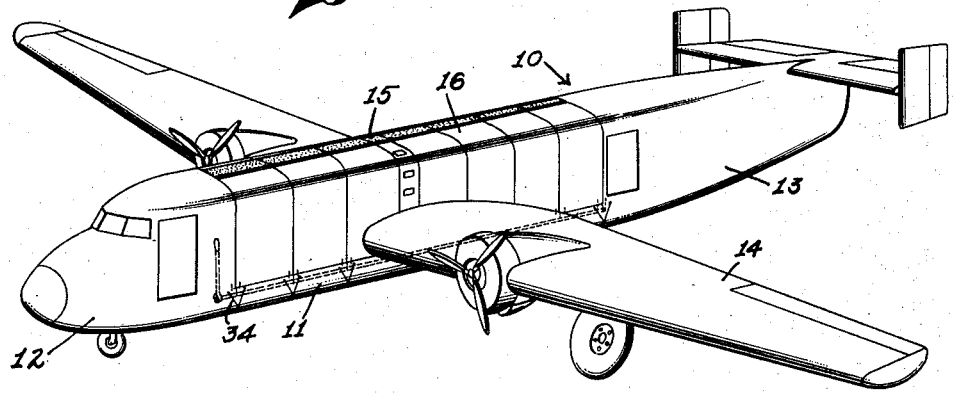
Fig. 1.
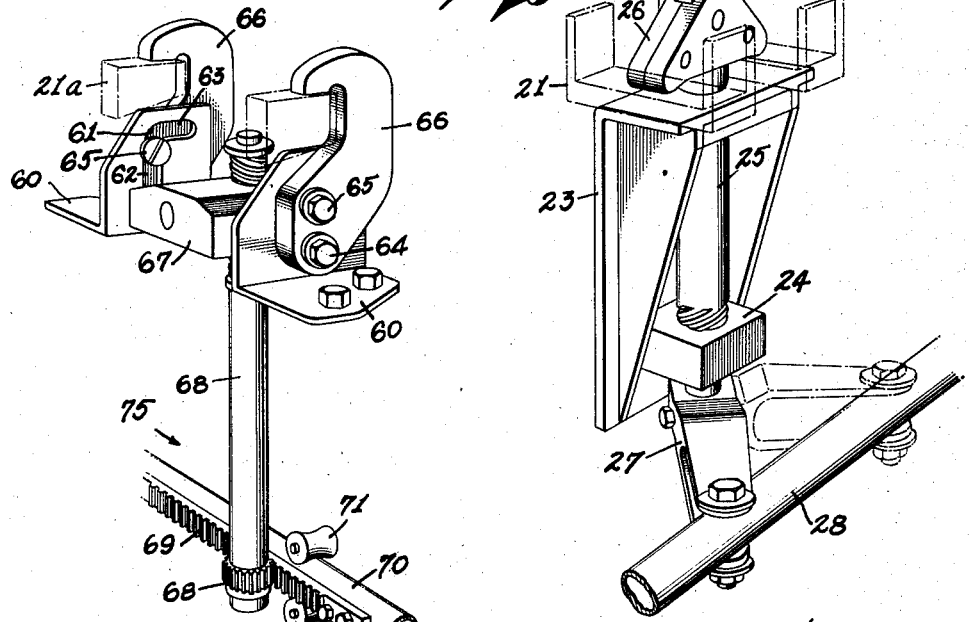
Fig. 2.
Fig. 3.
HARLAN D. FOWLER,
INVENTOR.
BY
ATTORNEY.

April 13, 1948. H. D. FOWLER 2,439,423
LOCKING AND SAFETY SIGNAL COMBINATION FOR CARGO AIRPLANES
Filed Dec. 21, 1942 4 Sheets-Sheet 2

HARLAN D. FOWLER,
INVENTOR.

BY
ATTORNEY.

April 13, 1948. H. D. FOWLER 2,439,423
LOCKING AND SAFETY SIGNAL COMBINATION FOR CARGO AIRPLANES
Filed Dec. 21, 1942 4 Sheets-Sheet 3
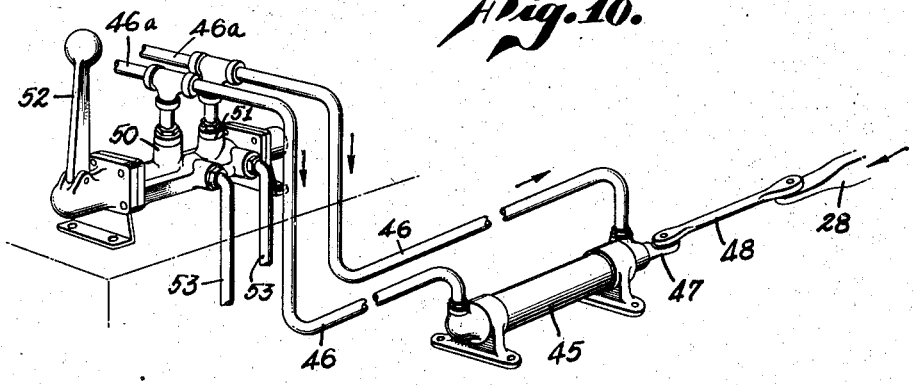
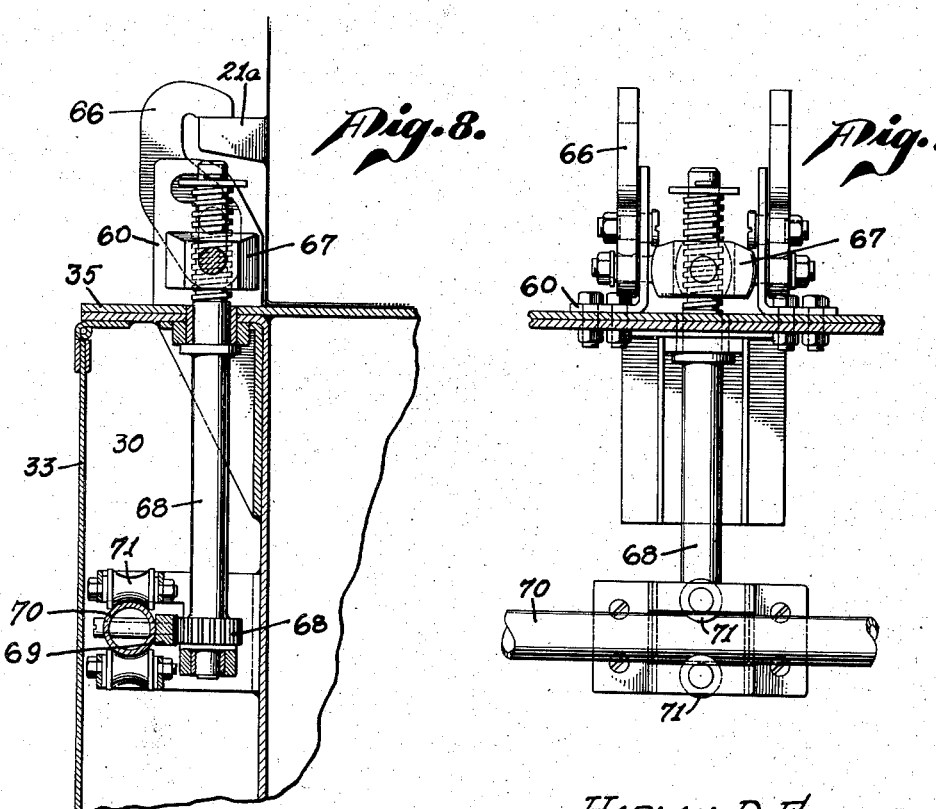
HARLAN D. FOWLER,
INVENTOR.
BY
ATTORNEY.

April 13, 1948.  H. D. FOWLER  2,439,423
LOCKING AND SAFETY SIGNAL COMBINATION FOR CARGO AIRPLANES
Filed Dec. 21, 1942  4 Sheets-Sheet 4
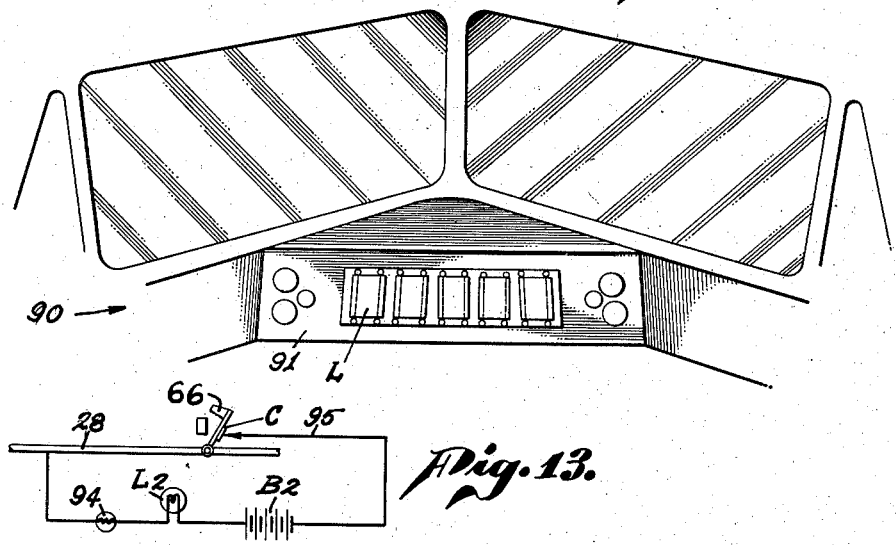
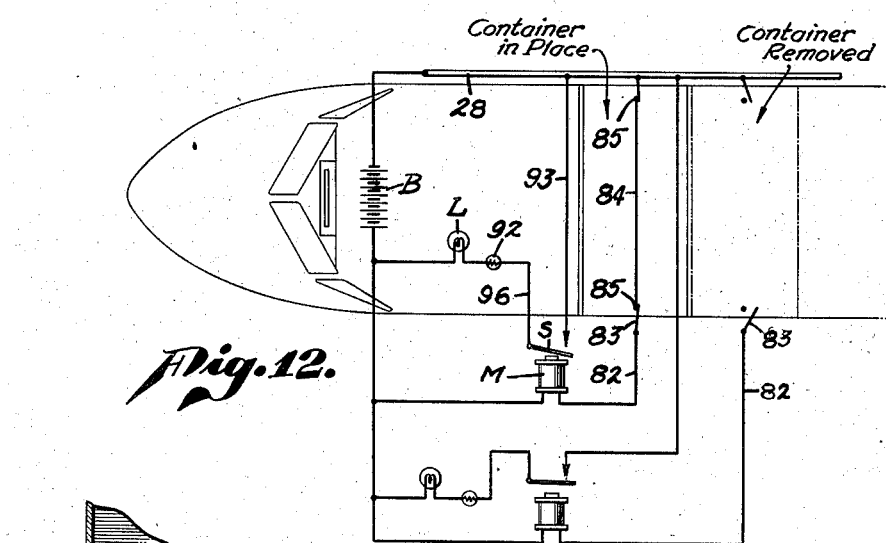
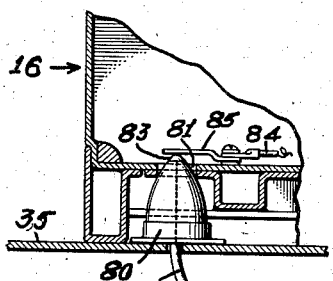
HARLAN D. FOWLER,
INVENTOR.
BY
ATTORNEY.

Patented Apr. 13, 1948

2,439,423

UNITED STATES PATENT OFFICE 2,439,423

LOCKING AND SAFETY SIGNAL COMBINATION FOR CARGO AIRPLANES

Harlan D. Fowler, San Diego, Calif.

Application December 21, 1942, Serial No. 469,620

8 Claims. (Cl. 244—118)

This invention relates to cargo airplanes, and particularly to a locking and safety signal combination in airplanes comprising removable cargo containers which form part of the fuselage when installed.

In my U. S. Patent No. 1,992,941 granted March 5, 1935 for Airplane construction, I disclosed and claimed a cargo airplane embodying an elongated fuselage platform and interchangeable cargo containers adapted for removable installation on the platform, the containers when thus assembled completing the fuselage. I have shown and claimed improvements on such an airplane in my copending application Ser. No. 470,326, filed December 28, 1942, now Patent No. 2,407,774, for Airplane construction, and on the containers in my copending application, Ser. No. 469,390, filed December 18, 1942, for Cargo container for airplane.

The present application is directed to improvements in the means for locking such containers to the fuselage platform and a signal arrangement for indicating in the pilot compartment the presence or absence of containers and the locked or unlocked condition of the several locking devices.

It is therefore an object of my invention to provide an improved locking system for quickly locking removable containers to the platform deck of an airplane.

A further object in that connection is to provide a locking system controllable from the pilot compartment to simultaneously lock or unlock all of the locks in the series.

An additional object is to provide signal circuits for the several containers and their associated locks whereby signal lights in the pilot compartment indicate first, whether the containers are in place on the fuselage platform, and second, whether such containers are locked down.

Other objects and advantages will become apparent from further consideration of the description and drawings.

In the drawings:

Figure 1 is a perspective view of a cargo airplane of the character described.

Figure 2 is an enlarged detail in perspective of my improved lock for securing the cargo containers in place.

Figure 3 is an enlarged detail in perspective of a modified form of lock.

Figure 8 is a somewhat similar view showing the lock closed.

Figure 9 is a front elevation of the same.

Figure 10 is a perspective view of a hydraulic system which may be employed for operating the locks instead of manual means.

Figure 11 is an elevation of the signal lamp panel in the pilot compartment.

Figure 12 is a wiring diagram of one signal circuit.

Figure 13 is a wiring diagram of a modified circuit arrangement.

Figure 14 is a fragmentary sectional view showing a locating and shift preventing plug on the airplane platform, with a container engaged thereby.

Figure 4:
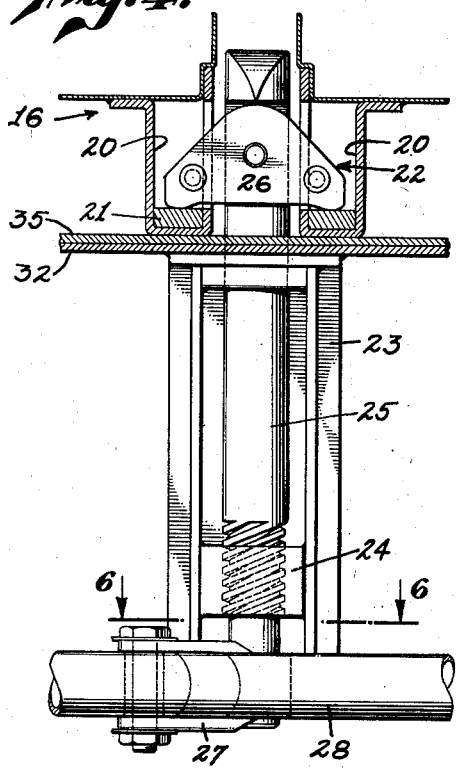
Figure 4 is a front elevation of the lock shown in Figure 2.

Referring to Figure 1, I there illustrate an airplane 10, comprising an elongated fuselage platform 11 supporting a nose compartment 12 and a tail assembly 13. Wings 14 extend from the platform, and except for a mounting of the leading wing spar (not shown) on the platform within a vertical housing 15, have their inner ends terminating at the edges of the platform, and do not interfere with the installation or removal of the cargo containers 16. Further details of the airplane shown are described in my aforesaid copending application.

The cargo containers 16 are constructed with recesses 20 in the sides thereof and near each corner, in which recesses lugs 21 are located. These lugs are either a part of the frame structure of the container or securely attached thereto, as they are for the purpose of being engaged by the locks 22.

The locks are all alike and description of one will suffice.

A bracket 23 is bolted or otherwise secured to the fuselage platform, and carries a stationary block 24. A jackscrew 25 is threaded through the block, and carries on its upper end a double clamping member 26 the opposed wings of which are adapted to enter the adjacent recesses 20 and engage the lugs 21 when drawn down by the jackscrew, and to move up when rotated 90° to clear the lugs. An arm 27 is keyed to the lower end of the jackscrew, and is pivotally connected to a shaft 28, so that when the shaft is moved longitudinally, whether by the hydraulic control shown in Figure 10, or by manual or mechanical means, the jackscrew is rotated into locking or open position depending upon the direction of movement.

The purchase provided by the jackscrew causes the clamp 26 to remain tight when brought down upon the lugs of the containers. The lock will operate even if one container is not in place.

Figure 5:
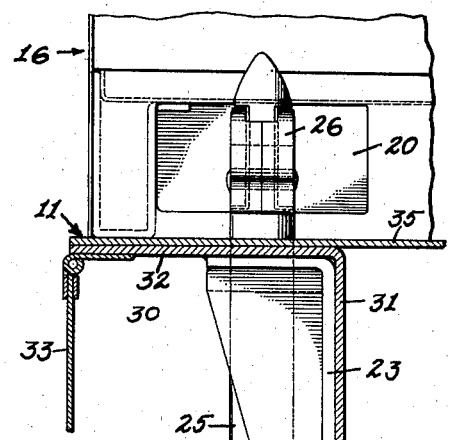
Figure 5 is a side elevation of the same.
Figure 7:
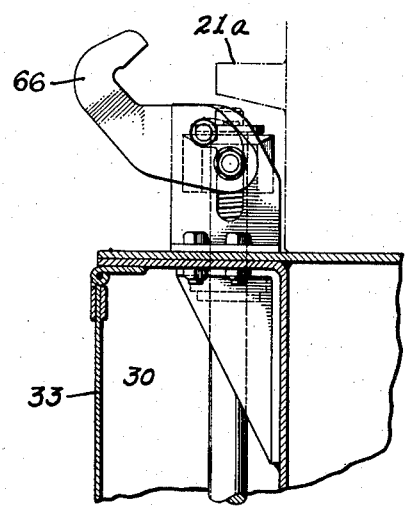
Figure 7 is a side elevation of part of the lock shown in Figure 3, but open.
Figure 6:
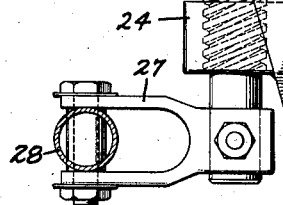
Figure 6 is a cross section taken on the line 6—6 of Figure 4.

Certain further structural details, omitted from Figure 2 for reasons of clarity, are shown in Figures 4 to 6. The jackscrew or jackshaft 25 and actuating parts are preferably located in a channel 30 formed along the side of the platform 11 of the airplane, which channel comprises a wall 31 and a horizontal ledge 32, and a skin of fabric or other suitable material 33 covers the outer part of the channel. Convenient flaps 34 fastened by zippers or other means provide access to the locks.

The platform 11 may include a floor or deck 35 overlying the ledge 32, and if so, the container will rest upon this floor as seen in Figures 4 and 5. The jackshaft extends up through a hole in the ledge and floor into the space between adjacent containers and within the streamline profile of the fuselage, so that the locks offer no drag.

The shaft 28 may be shifted longitudinally to open or close the locks either by the hydraulic control shown in Figure 10, or by any other suitable mechanical, electrical, or manual means.

The hydraulic control shown in Figure 10 comprises a standard hydraulic jack 45 connected in a hydraulic line 46 for two way movement of the conventional piston therein, not illustrated, the latter of which is coupled through a piston rod 47 and a link 48 with the shaft 28. The shaft is thus adapted to be shifted longitudinally. If used in connection with the locks 22, the link 48 may not be essential, but I propose optionally coupling the hydraulic jack 45 to the form of lock shown in Figure 3, which would require the link 48 for reasons later explained.

The hydraulic line includes two way valves 50 and 51 operated by a control lever 52 and by which hydraulic fluid is passed from lines 53 selectively in either direction through the lines 46 to the jack 45. Conventional discharge lines may be employed. The control lever 52 should be located in the pilot compartment or control cab. Lines 46a which are twins of the lines 46 lead to the lock system on the opposite side of the plane.

The modified form of lock shown in Figures 3, 7, 8 and 9 is intended to be used with a different form of container lug 21a, which may extend outwardly from the side of the container as shown particularly in Figure 8. In this case, the plane platform 11 may be the same, but the container will be somewhat narrower than the deck of the platform as there illustrated.

The lock comprises a pair of angle brackets 60 which may be bolted down to the deck 35 of the platform 11. Each bracket is formed with an angular slot 61 having a vertical portion 62 and a horizontal portion 63. Confined in these slots are oppositely disposed sets of pins 64 and 65. Both sets of pins are pivotally carried in oppositely disposed hooks 66, and the pins 64 extend through and are screwed into a travelling block 67 so that they move up and down therewith as subsequently explained. The hooks 66 are adapted to assume the locking position shown in Figure 3, or the unlocked position shown in Figure 7. The block is threaded to receive a jackscrew 68, rotation of which raises or lowers the block 67. This jackscrew is caused to rotate by engagement of a small gear 68 with the teeth of a rack 69 which is bolted or otherwise secured to a rod 70 extending longitudinally of the fuselage platform. This rod 70 has suitable spaced bearing supports which may be in the form of concaved rollers 71. The jackscrew, rack, and rollers are preferably located in the channel 30 provided at the side of the fuselage platform, so that they are within the streamline form of the fuselage but readily accessible for inspection or adjustment. The rod 70 extends along the several containers to operate similar locks for each container, and its forward end terminates in a coupling with the link 48 or other shifting means.

When the rod is shifted in the direction of arrow 75 (Figure 7), the hooks pivot from the closed position there shown to the open position (Figure 3). They may be opened by shifting the rod 70 in the direction opposite the arrow 75 in Figure 3. They cannot accidentally open because of the compound movement necessary to operate them. When closed, sets of pins 64 and 65 are disposed in the vertical portion of the slots 62. The hooks cannot pivot open until they have been elevated to the point where the pins 65 can enter the horizontal portion 63 of the slots. The hooks are thus first lifted, and then swung open. In closing, the reverse is true, the hooks first swing in and over the lugs 21a, and are then tightened down on the lugs by further movement of the rod 70. The mechanical advantage obtained through the jackscrew is such that it is virtually impossible for the hooks to even loosen except by intentional operation.

The terms jackscrew and jackshaft are used synonymously in the specification and claims, relative to both forms of locking device.

A device for locating the container on the airplane platform and preventing shifting thereon is shown in Figure 14. It comprises a plug 80 secured upon the deck 35 of the platform 11, which engages in a socket 81 in the bottom structure of the container 16. Usually I employ one of these plug and socket arrangements on each side of the container. More may be employed if desired, especially if a double or triple length container is used in place of the single unit size illustrated.

In connection with a safety signal system later described, I use the plug as a contact element in an electrical circuit, the latter being shown in Figure 12. The plug has connected to it a wire 82 leading to a contact point 83. The container carries a wire 84 terminating in a spring contact member 85. Thus, when the container is in place, contact is established through the elements 83 and 85. Similar devices are provided in conjunction with both of the plug and socket devices, the wire 84 leading across the container (suitably enclosed or concealed in any proper manner), and connected to the contact member 85 at the opposite side.

In the pilot compartment 90 (Figure 11), or at any other convenient location in the plane, is a series of signal lamps L which may be mounted on a panel 91, or in any other convenient manner. There will normally be one lamp for each of the containers 16. These lamps may be caused to blink or remain lighted or be dark to indicate whether or not the respective containers are in place on the airplane platform and also whether or not the containers are locked down to the platform. Various combinations of circuits may be employed for such purpose.

In Figure 12 I illustrate a simple form of circuit which may be employed to indicate whether or not a container is in place on the airplane platform. The battery B supplies current for lighting the lamp L, it being assumed that there is a lamp for each of the containers. The lamp may be in series with a blinker element 92, this being optional. One of the shafts 28 or 70 may be employed as a conductor in the circuit or a wire may be substituted therefor. A switch S closing contact with conductor 93 causes the lamp L to light and if the blinker is in the circuit the lamp will blink. This will indicate that the container indexed to that particular lamp is not in place. When the container is placed on the platform contact is made between members 83 and 85 which closes a circuit through magnet M, resulting in the switch S being opened and turning out the light. The two conditions discussed are illustrated in Figure 12.

In Figure 13 I show a simple form of circuit which may be employed to indicate whether or not the locks are closed or open. A battery B2 supplies current to a lamp L2 which may have in series with it a blinker 94. One of the shafts 28 or 70 may also be employed as a conductor and one of the locking members 22 or 66 may carry a contact C adapted when the lock is open as in Figure 13 to make a connection with a conductor 95 to close the lamp circuit and cause the lamp to light. When the lock 22 or 66 is closed the circuit would be broken and the lamp would be extinguished.

The above circuits may be employed separately or in combination. If in combination for the purpose of indicating the presence or absence of a container as well as the condition of the locks for the container, the combined circuits may be modified so that by the use of a single lamp a steady light may indicate that there is no container in place, a blinking light may indicate that a container has been placed but not locked, and a dark lamp may indicate that the locks are closed. It is thought that the modification necessary in thus combining the two circuits will be apparent to anyone skilled in the art. For example, to accomplish this, the blinker 92 (Figure 12) may be eliminated, and the lock contact C—95 with blinker 94 (Figure 13) may be introduced between conductor 93 and the conductor 96 beyond the switch S. Thus, when the switch S is closed, the light will burn steadily, when it is opened by the presence of a container, the contact C—95 with blinker 94 will cause the light to blink, and when the contact C—95 is broken by closing the lock, the light will go dark. Other variations of the signalling arrangement may, of course, be employed.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

Having described my invention, what I claim as new and desire to secure by Letters Patent is:

1. A lock for engaging a part of a device to releasably secure the latter upon a platform comprising: a threaded part carried by said platform, a jackshaft threadedly engaging said part and rotatably mounted therein adjacent said platform, a clamping head rigidly secured upon said shaft above said part, and means to rotate said jackshaft whereby said clamping head may be simultaneously turned and drawn into locking position, or turned oppositely and raised into releasing position.

2. A locking means for engaging a part of a device to releasably secure the latter upon a platform comprising: a threaded part carried by said platform, a jackshaft threadedly engaging said part and rotatably mounted therein adjacent said part, a clamping head rigidly secured upon said shaft in a plane above that of said part, and means remotely operable to rotate said jackshaft whereby said clamping head may be simultaneously turned and drawn down into locking position, or turned oppositely and raised into releasing position.

3. For use in releasably locking a cargo or other container upon the platform of an airplane of the character described, a lock comprising: a jackscrew rotatably supported on said platform, a traveling block in which said jackscrew is threadedly engaged, guiding means for said block whereby rotation of the jackscrew will advance or retract the block, means adapted to rotate said jackscrew, said container having a part arranged to be clamped, a clamping hook for engaging said part on said container, said hook being pivotally mounted on said block, a fixed member on said platform formed with an angled guide slot, and spaced guide pins extending from said hook into said slot whereby upon movement of said block the hook is given an initial rotating movement to position it for engagement with said container part and a succeeding longitudinal movement toward said part for locking engagement with the same, the reverse series of movements by said block and said hook unblocking said hook.

4. A mechanism for removably securing a cargo or other container upon the platform of an airplane having a compartment for personnel, said mechanism including a stationary threaded block which is adapted to be mounted on said platform, a jackscrew threadedly supported in said block so that it may be extended when turned in one direction and retracted when turned in the opposite direction, a clamping element carried by said jackscrew, an arm on said jackscrew for turning the latter and in so doing swing the clamping element to a clamping position and draw it into tight engagement with said container, a control member adapted to be mounted in said compartment, and means connecting said control member and arm, whereby to enable said clamp to be actuated from the compartment.

5. An airplane cargo container combination comprising a fuselage having streamlined nose and tail portions and a streamlined platform therebetween having a flat deck, a plurality of removable cargo containers on the deck having a form and volume adapted to fill the space on the platform between the nose and tail portions, locking members on the containers adjacent the outside lower edges thereof, rotatable locking shafts extending vertically through the deck at locations immediately adjacent said locking members when in place on the deck, elements attached to said shafts and extendable by rotation of said shafts, said elements being located above the deck and having a length sufficient to overlie the next adjacent locking member and having a lateral extension into potential engaging position with said locking members and a vertical extension toward and away from said locking members for tightening and releasing said containers and a support for each shaft, and a common longitudinally extending shaft on each side of the platform attached to the respective vertically extending shafts having a control therefor located in said nose portion.

6. An airplane cargo container combination comprising a fuselage having streamlined nose and tail portions and a streamlined platform therebetween having a flat deck, a plurality of removable cargo containers on the deck having a form and volume adapted to fill the space on the platform between the nose and tail portions, locking members on the containers adjacent the outside lower edges thereof, rotatable locking shafts extending vertically through the deck at locations immediately adjacent said locking members when in place on the deck, elements on said shafts located above the deck, said elements having a length sufficient to overlie the next adjacent locking member and having a lateral extension into potential engaging position with said locking members and a vertical extension toward and away from said locking members for tightening and releasing said containers and a support for each shaft, and a common longitudinally extending shaft on each side of the platform attached to the respective vertically extending shafts and adapted to impart rotation thereto, said longitudinally extending shaft having a control therefor located in said nose portion and a channel adapted to receive each said longitudinally extending shaft, said channel being located within the streamlined exterior of the platform and comprising an inner wall, a horizontal ledge apertured for reception of the vertically extending shafts, and an outer flexible skin attached to the ledge closing said channel.

7. An airplane cargo container combination comprising a fuselage having streamlined nose and tail portions and a streamlined platform therebetween having a flat deck, a plurality of removable cargo containers on the deck having a form and volume adapted to fill the space on the platform between the nose and tail portions, locking members on the containers adjacent the outside lower edges thereof, rotatably and axially movable locking shafts extending vertically through the deck, transversely disposed elements on said shafts located above the deck having a length sufficient to overlie the next adjacent locking member and having movement toward and away from said locking members for tightening and releasing said containers, a supporting bracket for the shaft having a vertical portion and having a horizontal portion beneath the deck at a location beneath the locking members on said containers, and a common longitudinally extending shaft on each side of the platform attached to the respective vertically extending shafts having a control therefor located in said nose portion.

8. An airplane cargo container combination comprising a fuselage having streamlined nose and tail portions and a streamlined platform therebetween having a flat deck, a plurality of removable cargo containers on the deck having a form and volume adapted to fill the space on the platform between the nose and tail portions, locking members on the containers adjacent the outside cover edges thereof, rotatably mounted, axially extendable locking shafts extending vertically through the deck, transversely disposed elements on said shafts located above the deck having portions thereof extending from the axis of the respective shaft a distance sufficient to overlie the next adjacent locking member, said portions having a lateral extension into potential engaging position with said locking members and a vertical extension toward and away from said locking members for tightening and releasing said containers, a supporting bracket for the shaft having a vertical portion and having a horizontal portion beneath the deck at a location beneath the locking members on said containers, a common longitudinally extending shaft on each side of the platform attached to the respective vertically extending shafts having a control therefor located in said nose portion and a channel adapted to receive each said longitudinally extending shaft located within the streamlined exterior of the platform comprising an inner wall, a horizontal ledge between the brackets and the deck apertured for reception of the vertically extending shafts, an outer flexible skin attached to the ledge closing said channel, and a flap in the skin adjacent each vertically extending shaft having releasable fastening means at the edges thereof.

HARLAN D. FOWLER.

REFERENCES CITED

The following references are of record in the file of this patent:

UNITED STATES PATENTS

| Number | Name | Date |
|---|---|---|
| 887,805 | Higgins | May 19, 1908 |
| 1,342,802 | Gerli et al. | Jan. 9, 1920 |
| 1,343,568 | Leitch | June 15, 1920 |
| 1,477,723 | Smith | Dec. 18, 1923 |
| 1,649,598 | Kirchner | Nov. 15, 1927 |
| 1,772,939 | Fitch | Aug. 12, 1930 |
| 1,992,941 | Fowler | Mar. 5, 1935 |
| 2,053,969 | Olds | Sept. 8, 1936 |
| 2,075,042 | Knerr | Mar. 30, 1937 |
| 2,127,864 | Girard | Aug. 23, 1938 |
| 2,144,957 | Bell | Jan. 24, 1939 |
| 2,321,824 | Knight | June 15, 1943 |

FOREIGN PATENTS

| Number | Country | Date |
|---|---|---|
| 310,770 | Germany | June 3, 1919 |
| 365,861 | Germany | Oct. 30, 1921 |